United States Patent
Hake et al.

(10) Patent No.: US 6,247,083 B1
(45) Date of Patent: Jun. 12, 2001

(54) METHOD AND APPARATUS FOR BI-DIRECTIONALLY TRANSFERRING DATA BETWEEN AN IEEE 1394 BUS AND A DEVICE TO BE CONTROLLED BY A CONTROL SIGNAL TRANSMITTED VIA THE BUS

(75) Inventors: Hans-Hermann Hake; Timothy Heighway; Heinz-Werner Keesen, all of Hannover (DE)

(73) Assignee: Duetsche Thomson-Brandt GmbH, Villingen-Schwenningen (SE)

( * ) Notice: Subject to any disclaimer, the term of this patent is extended or adjusted under 35 U.S.C. 154(b) by 0 days.

(21) Appl. No.: 09/232,108

(22) Filed: Jan. 15, 1999

(30) Foreign Application Priority Data

Jan. 27, 1998 (EP) .................................. 98250026

(51) Int. Cl.$^7$ .................................................. G06F 13/00
(52) U.S. Cl. .......................................... 710/107; 710/129
(58) Field of Search ................................. 710/100, 107, 710/129

(56) References Cited

U.S. PATENT DOCUMENTS

| 5,579,486 |   | 11/1996 | Oprescu et al. |         |
|-----------|---|---------|----------------|---------|
| 5,815,678 | * | 9/1998  | Hoffman et al. | 710/129 |
| 5,919,261 | * | 7/1999  | Aoki et al.    | 713/300 |
| 5,991,520 | * | 11/1999 | Smyers et al.  | 710/100 |
| 6,032,211 | * | 2/2000  | Hewitt         | 710/107 |

FOREIGN PATENT DOCUMENTS

| 0784401A2 | 7/1997 | (EP) | H04N/5/44 |
| 97/28504  | 8/1997 | (WO) | G06F/13/10 |

* cited by examiner

Primary Examiner—Glenn A. Auve
(74) Attorney, Agent, or Firm—Joseph S. Tripoli; Paul P. Kiel

(57) ABSTRACT

The IEEE 1394 bus communication protocol has three layers: physical layer, link layer, and transaction layer. Typically, the transaction layer is realized by firmware whereas the other layers are implemented using chip sets. The link layer IC usually contains a FIFO having a capacity of e.g. 32k or 64k bits. Therefore, the link layer chip is the most costly part of a complete IEEE 1394 interface. Due to these cost reasons most ICs on the market are not bi-directional although the IEEE 1394 bus specification supports this feature. Incoming or outgoing data packets are intermediately stored in the FIFO. The current solution to this problem is to have two separate IEEE 1394 bus nodes assigned to the same application, the two nodes including two physical layer ICs and two link layer ICs. The inventors have found that although the physical link layer interface is not designed for this purpose, it works correctly with up to three link layer ICs and one physical layer IC if the additional link layer IC/ICs is/are programmed respectively. Therefore two or more link layer ICs can operate together with one physical layer IC in one node wherein the link layer ICs are connected to the same application or device.

10 Claims, 3 Drawing Sheets

METHOD AND APPARATUS FOR BI-DIRECTIONALLY TRANSFERRING DATA BETWEEN AN IEEE 1394 BUS AND A DEVICE TO BE CONTROLLED BY A CONTROL SIGNAL TRANSMITTED VIA THE BUS

FIELD OF THE INVENTION

The present invention relates to a method and to an apparatus for transferring bi-directionally data between an IEEE 1394 bus and a device to be controlled by said bus.

BACKGROUND OF THE INVENTION

The IEEE 1394 bus is a low cost, high performance serial bus. It has a read/write memory architecture and a highly sophisticated communication protocol. Data rates of 100, 200 or 400 Mbit/s can be transmitted in nearly real time. Simultaneously, data can be transmitted bi-directionally. The first ten bits of transmitted address values refer to one of up to 1023 possible IEEE 1394 bus clusters. The following six bits of the transmitted address values refer within a specific cluster to one of up to 63 nodes to which an application or device is assigned. Data between nodes can be exchanged without interaction of a host controller. Devices can be connected to or disrupted from the network at any time, allowing a plug and play behavior.

The standardized cable connection for the nodes has a length of 4.5 m and contains three twisted cable pairs of which two pairs serve for data and control information transmission and the further pair carries supply voltages of 8V to 40V. Three level coding is used: HIGH (H), LOW (L), and HIGH IMPEDANCE (Z). H overrides L, L overrides Z. The characteristic impedance is 110 Ω. There is also a version IEEE 1394-1995 of the bus specification including only two twisted pairs of cables on which no power supply voltage is present. The communication protocol has three layers: physical layer, link layer, and transaction layer. Typically, the transaction layer is realized by firmware whereas the other layers are implemented using chip sets.

The physical layer contains analog transceivers and a digital state machine. It handles bus auto-configuration and hot plug. It reclocks, regenerates and repeats all packets and forwards all packets to the local link layer. It carries out-packet framing, for example speed code, prefix, and packet end assembling. It arbitrates and transmits packets from the local link layer. Available integrated circuit ("IC") types are e.g. TSB11C01, TSB11LV01, TSB21LV03, and TSB41LV03 of Texas Instruments, MB86611 of Fujitsu, and 21S750 of IBM.

The link layer performs all digital logic. It recognizes packets addressed to the node by address recognition and decodes the packet headers. It delivers packets to higher layers and generates packets from higher layers. It works either isochronous for AV data use or asynchronous for control data use.

In the isochronous mode a channel having a guaranteed bandwidth is established. There is a defined latency. The transmission is performed in 125 μs time slots or cycles. Headers and data blocks of a packet have separate CRCs (cyclic redundancy check). This mode has a higher priority than the asynchronous data transfer mode.

The asynchronous mode is not time critical, but safe. It operates as an acknowledged service with a busy and retry protocol. Fixed addresses are used. Transmission takes place when the bus is idle. The asynchronous mode handles read request/response, write request/response, and lock request/response. It performs cycle control, CRC generation and validation. Available link layer IC types are e.g. TSB12C01A, TSB12LV21, TSB12LV31, and TSB12LV41 of Texas Instruments, and PDI1394L11 of Philips.

The transaction layer implements asynchronous bus transactions:

Read request/read response

Write request/write response

Lock request/lock response

As mentioned above it can be implemented by software running on a microcontroller, such as e.g. the i960 of SparcLite.

There may also be an AV (audio video) layer carrying out device control, connection management, timestamping, and packetizing.

SUMMARY OF THE INVENTION

The link layer IC usually contains a FIFO (first in first out) memory having a capacity of e.g. 32k or 64k bits and further buffers and adapts the data coming from the application to the requirements of the IEEE 1394 bus specification. Therefore, the link layer chip contains a lot of circuitry and is the most costly part of a complete IEEE 1394 interface. Due to these cost reasons most ICs on the market are not bi-directional although the IEEE 1394 bus specification supports this feature. Incoming or outgoing data packets are intermediately stored in the FIFO.

It is true that some link layer ICs are bi-directional, but for a lot of applications, e.g. video data operation, the memory size of such standard bi-directional link ICs is sufficient only for either transmission or reception of isochronous data at any one time. Therefore, in practice, such ICs can only be used in one direction, i.e. real-time bi-directional data transfer is not possible. A larger memory size was not chosen for such standard link ICs, because no necessity for real-time bi-directional data transfer was seen which would justify the additional costs. The current solution to this problem is to have two separate IEEE 1394 bus nodes assigned to the same application, the two nodes including two physical layer ICs, two link layer ICs, two microcontrollers, and an additional cable connection, i.e. a quite complicated and expensive solution. The physical separation of the two nodes adds to the network latency and requires an additional cable hop. Because only 16 cable hops are allowed in the IEEE 1394 bus specification the latter requirement can cause a significant drawback in some applications.

It is one object of the invention to disclose a method for combining widely available, and therefore cheap, uni-directional IEEE 1394 bus link layer ICs to form a bi-directional data transfer functionality for an IEEE 1394 bus interface representing only one IEEE 1394 bus node.

It is a further object of the invention to disclose an apparatus which utilizes the inventive method.

The inventors have found, confirmed by simulations, that although the physical link layer interface is not designed for this purpose, it works correctly with up to three link layer ICs and one physical layer IC if the additional link layer IC/ICs is/are programmed respectively.

According to the invention, two or more link layer ICs operate together with one physical layer IC in one node wherein the link layer ICs are connected to the same application or device. Advantageously, all link layer ICs, the physical layer IC and the application can be controlled by a single microcontroller performing e.g. software control and bus management. Link ICs can be selectively addressed using e.g. a unique I2C bus address or host chip enable.

The invention allows simultaneous real-time input and output of data packets or simultaneous input of two data packets, e.g. the reception of a video channel and an audio channel or the reception of two video channels, for instance for PIP (picture-in-picture) purposes.

In principle, the inventive method is suited for transferring bi-directionally data between an IEEE 1394 bus and a device to be controlled by said bus, wherein for interfacing between the bus and said device a physical layer IC and a first link layer IC is used and wherein a second link layer IC is also in operation which is connected on one side to the interface input/output of said first link layer IC and on the other side to said device, wherein said first link layer IC performs input and output of bus-related data and said second link layer IC performs either input or output of bus-related data or wherein said first link layer IC performs input of first bus-related data and said second link layer IC performs input of second bus-related data and wherein said first and second bus-related data belong to different data streams, in particular two video data streams or one video and one audio data stream.

Advantageous additional embodiments of the inventive method are disclosed in the respective dependent claims.

In principle the inventive apparatus is suited for transferring bi-directionally data between an IEEE 1394 bus and a device to be controlled by said bus, and includes:

a physical layer IC and a first link layer IC for interfacing between the bus and said device;

a second link layer IC which is connected on one side to the interface input/output of said first link layer IC and on the other side to said device, wherein said first link layer IC performs input and output of bus-related data and said second link layer IC performs either input or output of bus-related data, or wherein said first link layer IC performs input of first bus-related data and said second link layer IC performs input of second bus-related data and said first and second bus-related data belong to different data streams, in particular two video data streams or one video and one audio data stream.

Advantageous additional embodiments of the inventive apparatus are disclosed in the respective dependent claim.

BRIEF DESCRIPTION OF THE DRAWINGS

Embodiments of the invention are described with reference to the accompanying drawings, which show in.

DETAILED DESCRIPTION OF PREFERRED EMBODIMENTS

Figure 1:
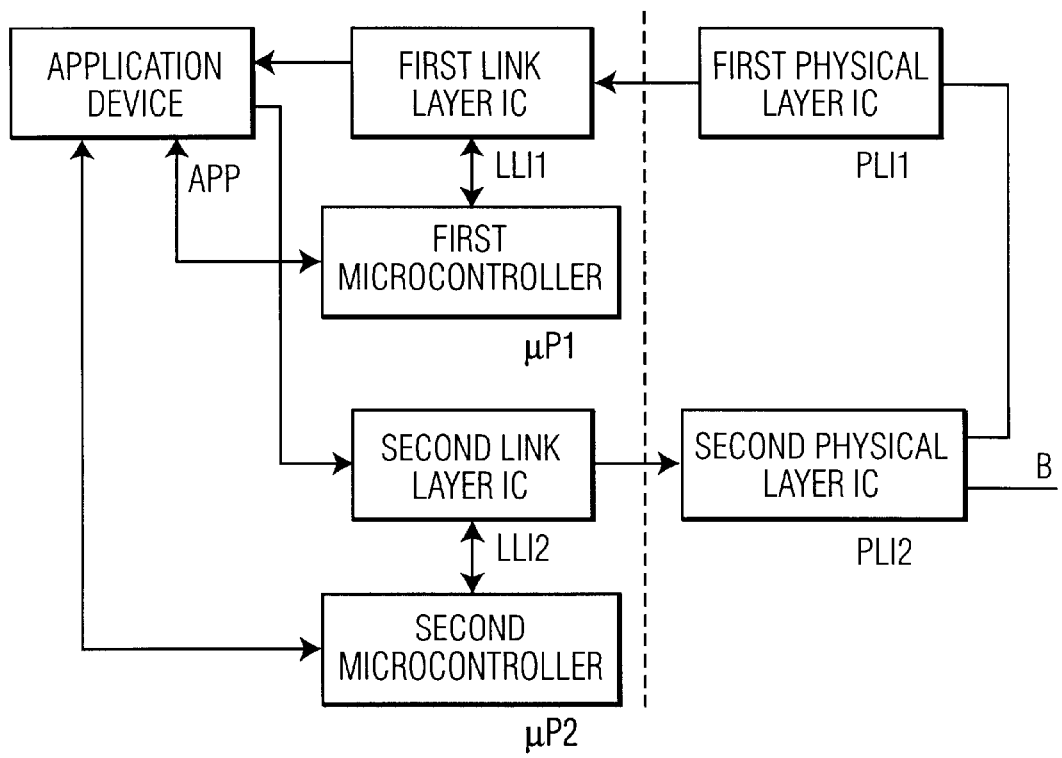
FIG. 1 known IEEE 1394 double-node for bi-directional real-time video applications.

In FIG. 1 a first physical layer IC PLI1 is connected via an IEEE 1394 bus cable connection to a second physical layer IC PLI2 which itself is also connected to the further IEEE 1394 bus cable B. PLI1 is at the other side assigned to a first link layer IC LLI1 for data input, and PLI2 is assigned to a second link layer IC LLI2 for data output. LLI1 and LLI2 are both assigned to the same application device APP. LLI1 and PLI1 via LLI1 are controlled by a first microcontroller $\mu$P1. LLI2 and PLI2 via LLI2 are controlled by a second microcontroller $\mu$P2. Application device APP can be controlled by $\mu$P1 and $\mu$P2, or by one of them. In both cases $\mu$P1 and $\mu$P2 may interact with each other (not depicted).

Figure 2:
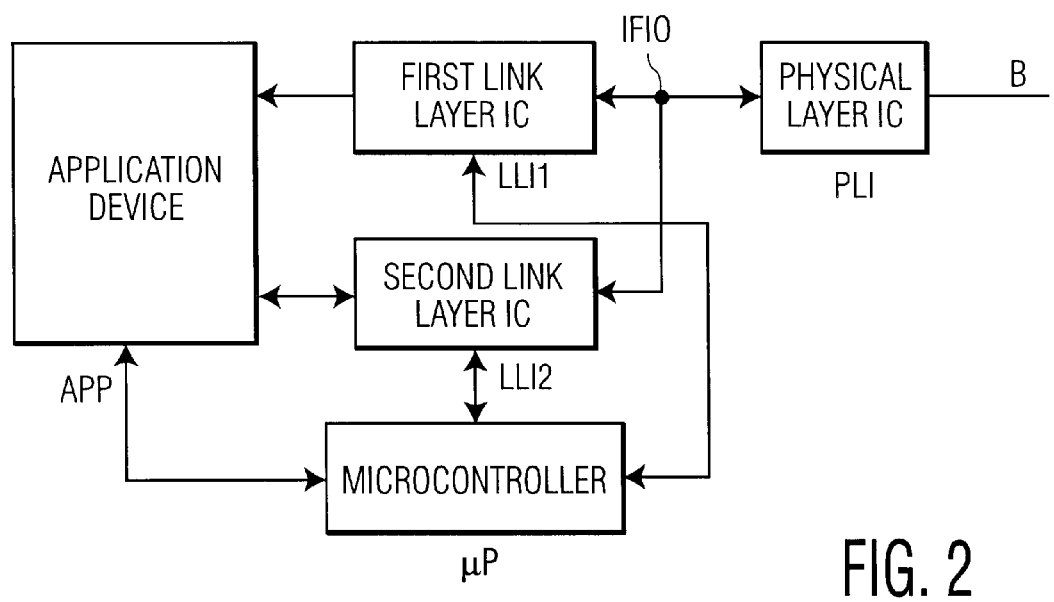
FIG. 2 IEEE 1394 node for bi-directional real-time video applications according to the invention.

In FIG. 2 a single physical layer IC PLI is connected to the IEEE 1394 bus cable B. PLI is at the other side assigned to a first link layer IC LLI1 for e.g. data input and to a second link layer IC LLI2 for data output and e.g. additionally data input. LLI1 and LLI2 are both assigned to the same application device APP. Advantageously, LLI1, LLI2, PLI via LLI1 or LLI2, and APP can all be controlled by a single microcontroller $\mu$P.

Figure 3:
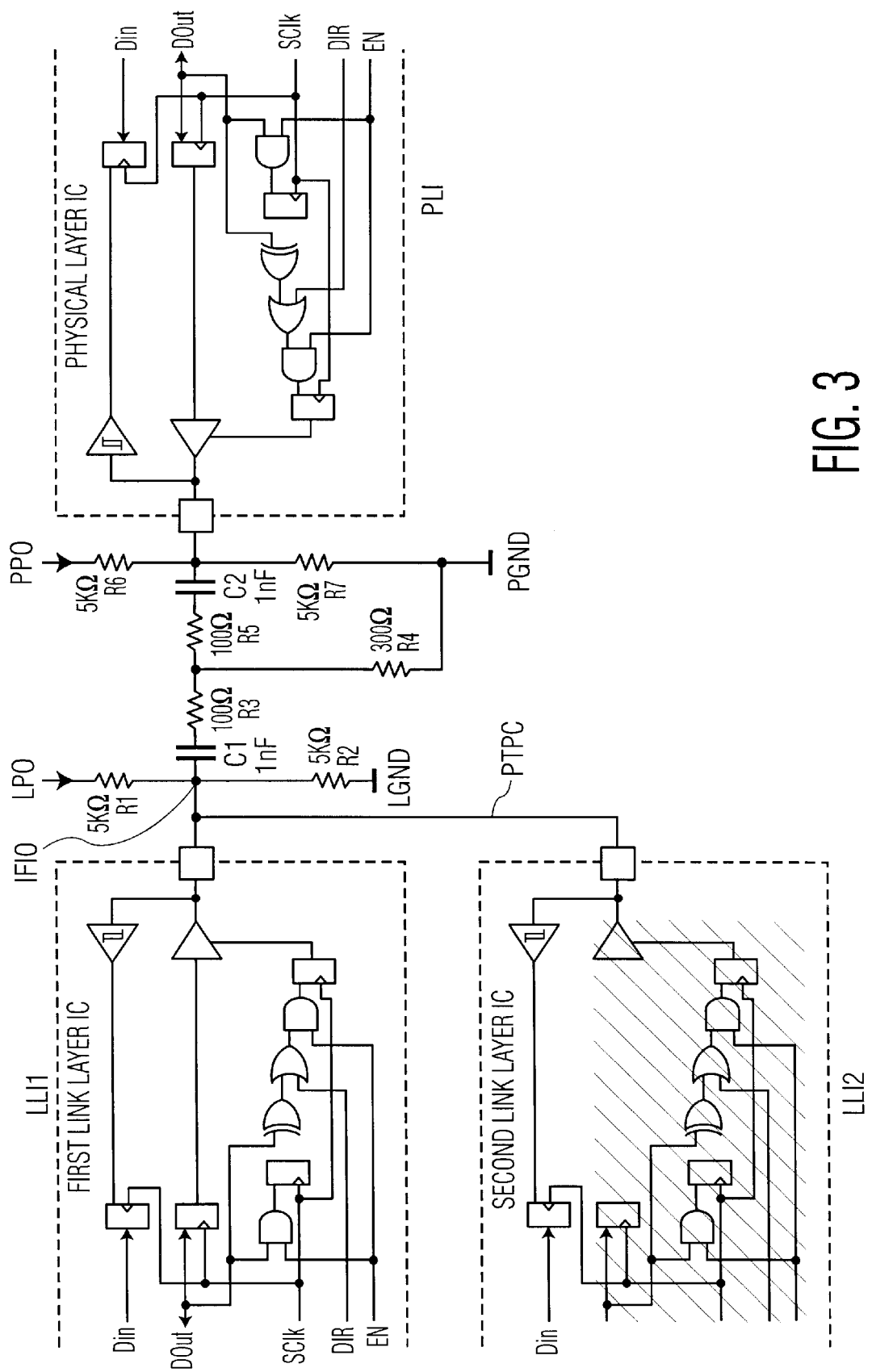
FIG. 3 the IEEE 1394 node of FIG. 2 in more detail, including a capacitive isolation barrier.

One more detailed configuration where the inventive bi-directional mode can be used, would be as in FIG. 3, where the first link IC LLI1 supports both input and output modes, and the second link IC LLI2 supports input (from the IEEE 1394 bus) only. This would be the simplest type of configuration for a bi-directional behavior with multiple link layer ICs and one physical layer IC PLI. FIG. 3 depicts the main circuitry in PLI and LLI1/LLI2 for data exchange. Advantageously the components behind the dashed lines in LLI2 can be omitted or not used.

With the setup as in FIG. 3, only LLI1 would be able to be the cycle master on the bus. This means that cycle start packets would be sent directly from LLI1 to LLI2 via interface input/output IFIO and pad to pad connection PTPC.

A simplification for LLI2 would be that the IEEE 1394-standardized link request pin LREQ (not depicted) to request the bus for transmission would not be required, as this IC is input only.

As mentioned above, simulations have shown that the capacitive isolation barrier feature of IEEE 1394 functions correctly with up to three link layer ICs and one physical layer IC. This isolation barrier is explained in detail in U.S. Pat. No. 5,384,808 and uses the following component values: Between physical power PP0 and physical ground PGND a chain of two 5 k$\Omega$ resistors R6 and R7 is arranged. Between link power LP0 and link ground LGND a chain of two 5 k$\Omega$ resistors R1 and R2 is arranged. PLI is connected to the R6/R7 junction and LLI1/LLI2 are connected to the R1/R2 junction. Between the R1/R2 junction and the R6/R7 junction a chain of C1/1nF, R3/100$\Omega$, R5/100$\Omega$, and C2/1nF is inserted. From the R3/R5 junction a resistor R4/300$\Omega$ is connected to PGND. Other versions of this PLI/LLI connecting circuitry are possible.

In this isolation barrier no appreciable degradation of logic levels occurs with the capacitive load of one or two extra link layer ICs on the pads of link A.

An additional addressing of each link layer IC can be achieved by a minor addition to a standard link layer IC design.

An extra channel number register and comparator are required per extra link layer IC used, so that data streams can be addressed to a particular link layer IC.

Other configurations can also be used, for example two link layer ICs and one physical layer IC with both link layer ICs having input and output functionality.

Figure 4:
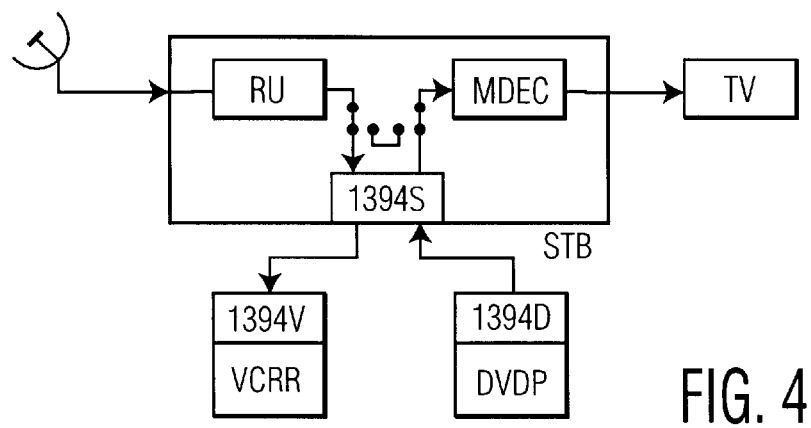
FIG. 4 an IEEE 1394 bus-connected set-top box, VCR and DVD player.

The invention can e.g. be used for an application as depicted in FIG. 4: A set-top box STB with receiving unit RU, MPEG decoder MDEC and IEEE 1394 interface 1394S receives a digital TV program via satellite or cable. The receiving unit output signal is transmitted via IEEE 1394 bus for the purpose of recording to a video recorder VCRR including also a IEEE 1394 interface 1394V. Simultaneously, a DVD player DVDP replays a DVD disc and the DVD data is also transported via an IEEE 1394 bus interface 1394D to the IEEE 1394 bus interface 1394S of the set-top box in order to be decoded by the MPEG decoder MDEC and to be displayed on the screen of a television receiver TV. TV may still have an analog signal connection to the set-top box, but may also be connected to STB by an IEEE 1394 bus interface. So, the set-top box IEEE 1394 bus node 1394S needs a bi-directional functionality.

Figure 5:
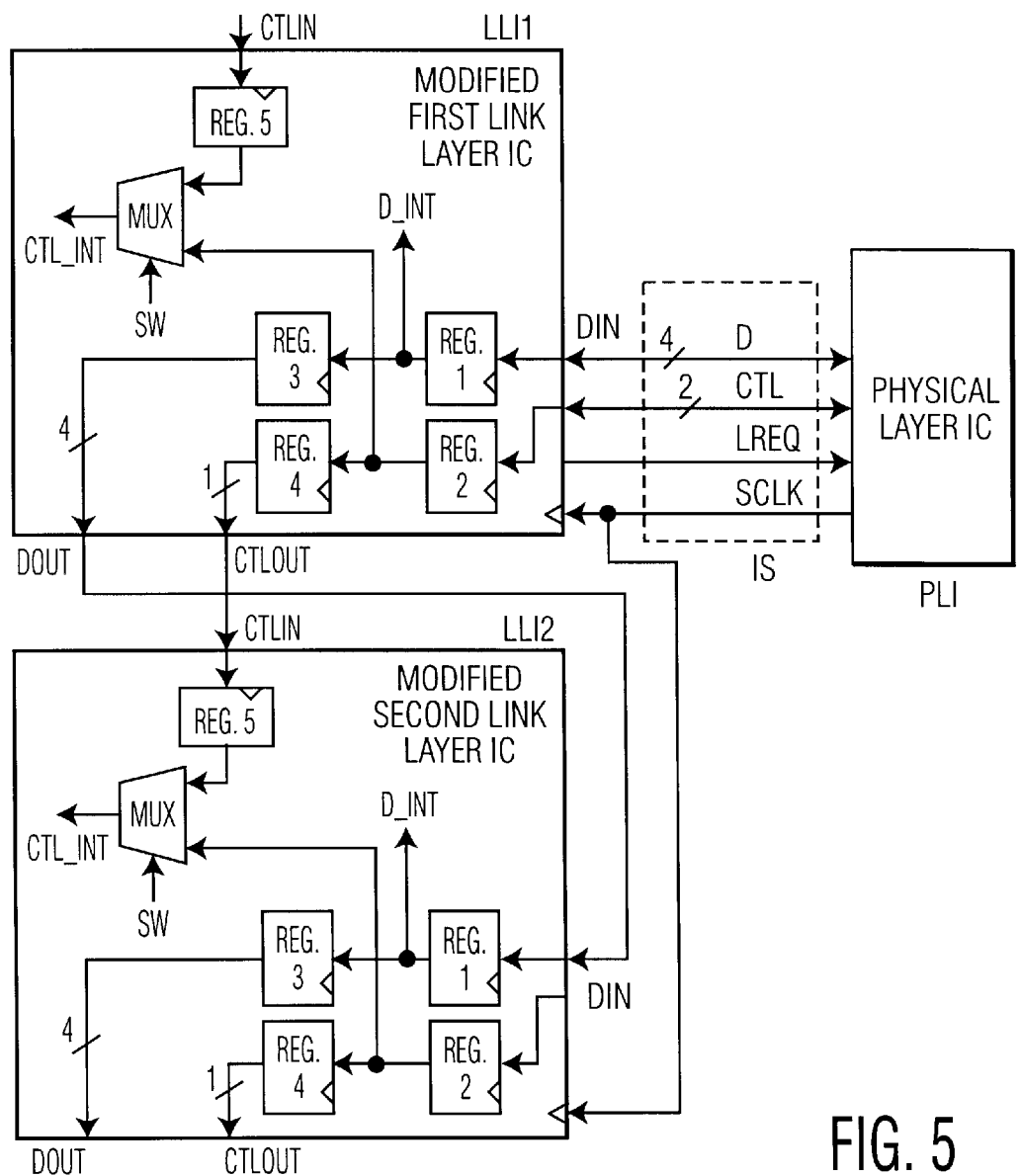
FIG. 5 IEEE 1394 node for bi-directional real-time video applications according to a further embodiment of the invention.

The further embodiment of FIG. 5 shows the connection of a single physical layer IC PLI to a slightly modified first link layer IC LLI1 for data output and e.g. additionally data input, and to a correspondingly modified second link layer IC LLI2 for data input, i.e. receive mode. LLI1 and LLI2 each include five registers REG1 to REG5 and a multiplexer or switch MUX which is controlled by a signal SW which determines whether the specific IC operates in the data receiving mode.

LLI1 and LLI2 have an additional control signal input CTLIN and two additional outputs DOUT for data and CTLOUT for the control signal. Bus control signal CTL passes through registers REG2 and REG4 and output CTLOUT of LLI1 to CTLIN of LLI2. Then it passes REG5 and MUX and is thereafter available within LLI2 as internal control signal CTL__INT. From the output of REG2 of LLI1 it is also fed to MUX and is thereafter available within LLI1 as internal control signal CTL__INT.

Bus data signal D passes via input DIN through registers REG1 and REG3 and output DOUT of LLI1 to DIN of LLI2. At the output of REG1 of LLI1 and LLI2 the internal bus data signal D__INT is available within LLI1 and within LLI2.

The bus link request signal LREQ is coming from LLI1 only. Bus clock SCLK is distributed to both, LLI1 and LLI2. D, CTL, LREQ, and SCLK can be transferred between PLI and LLI1 via an isolation circuitry IS.

LLI1 and LLI2 are both assigned to the same application device.

What is claimed is:

1. Method for bi-directionally transferring data between an IEEE 1394 bus and a device to be controlled by a control signal transmitted via the bus, comprising the following steps:
   interfacing between the bus and the device by a physical layer integrated circuit ("IC") and a first link layer IC;
   operating a second link layer IC which is connected on one side to an interface input/output of the first link layer IC and on a second side to the device, the first link layer IC performing input and output of bus-related data and the second link layer IC performing either input or output of bus-related data.

2. Method according to claim 1, wherein at least one further link layer IC is connected and operated in parallel with the second link layer IC.

3. Method according to claim 1, wherein the first and the second link layer ICs are controlled by a single microcontroller.

4. Method for bi-directionally transferring data between an IEEE 1394 bus and a device to be controlled by a control signal transmitted via the bus, comprising the following steps:
   interfacing between the bus and the device by a physical layer integrated circuit ("IC") and a first link layer IC;
   operating a second link layer IC which is connected on one side to an interface input/output of the first link layer IC and on a second side to the device, the first link layer IC performing input of first bus-related data and the second link layer IC performing input of second bus-related data, wherein the first and second bus-related data belong to different data streams, in particular two video data streams or one video and one audio data stream.

5. Method according to claim 4, wherein at least one further link layer IC is connected and operated in parallel with the second link layer IC.

6. Method according to claim 4, wherein the first and the second link layer ICs are controlled by a single microcontroller.

7. Apparatus for bi-directionally transferring data between an IEEE 1394 bus and a device to be controlled by a control signal transmitted via the bus, the apparatus comprising:
   a physical layer integrated circuit ("IC") and a first link layer IC for interfacing between the bus and the device;
   a second link layer IC which is connected on one side to an interface input/output of the first link layer IC and on a second side to the device, wherein the first link layer IC performs input and output of bus-related data and the second link layer IC performs either input or output of bus-related data.

8. Apparatus according to claim 7, wherein the first and the second link layer IC is controlled by a single microcontroller.

9. Apparatus for bi-directionally transferring data between an IEEE 1394 bus and a device to be controlled by a control signal transmitted by the bus, the apparatus comprising:
   a physical layer integrated circuit ("IC") and a first link layer IC for interfacing between the bus and the device;
   a second link layer IC which is connected on one side to an interface input/output of the first link layer IC and on a second side to the device, wherein the first link layer IC performs input of first bus-related data and the second link layer IC performs input of second bus-related data, wherein the first and second bus-related data belong to different data streams, in particular two video data streams or one video and one audio data stream.

10. Apparatus according to claim 9, wherein the first and the second link layer IC is controlled by a single microcontroller.

* * * * *